(No Model.) 2 Sheets—Sheet 1.
C. O. ELLISON.
CAMERA.
No. 442,616. Patented Dec. 16, 1890.
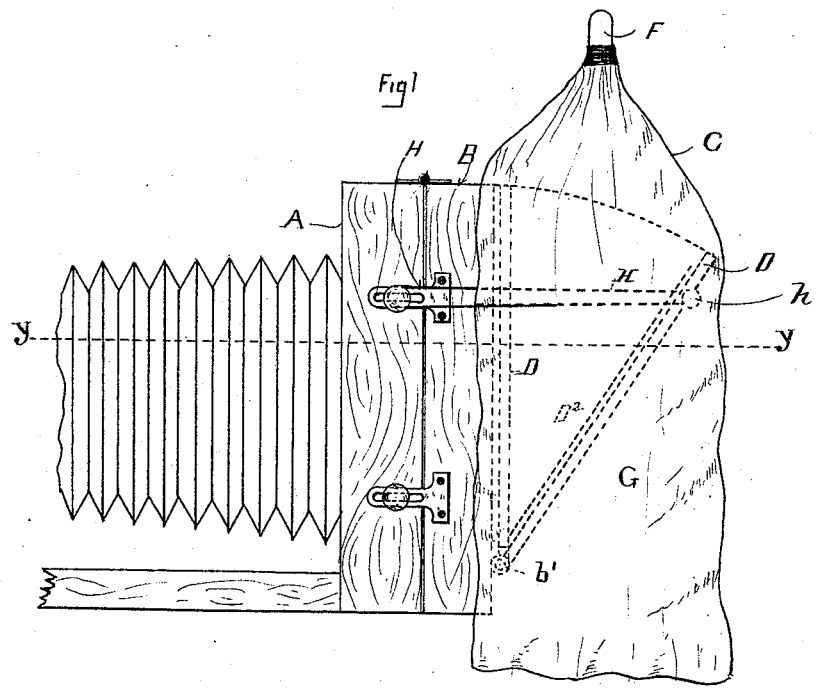
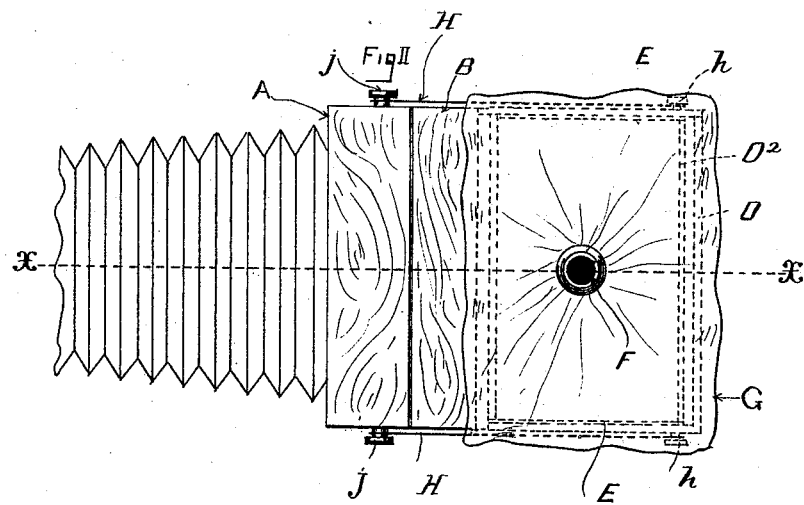
WITNESSES:
Franklin Barrett
Geo. E. Bouché
INVENTOR
Christopher O. Ellison
BY
James N. Lancaster
ATTORNEY (No Model.) 2 Sheets—Sheet 2.
C. O. ELLISON.
CAMERA.
No. 442,616. Patented Dec. 16, 1890.
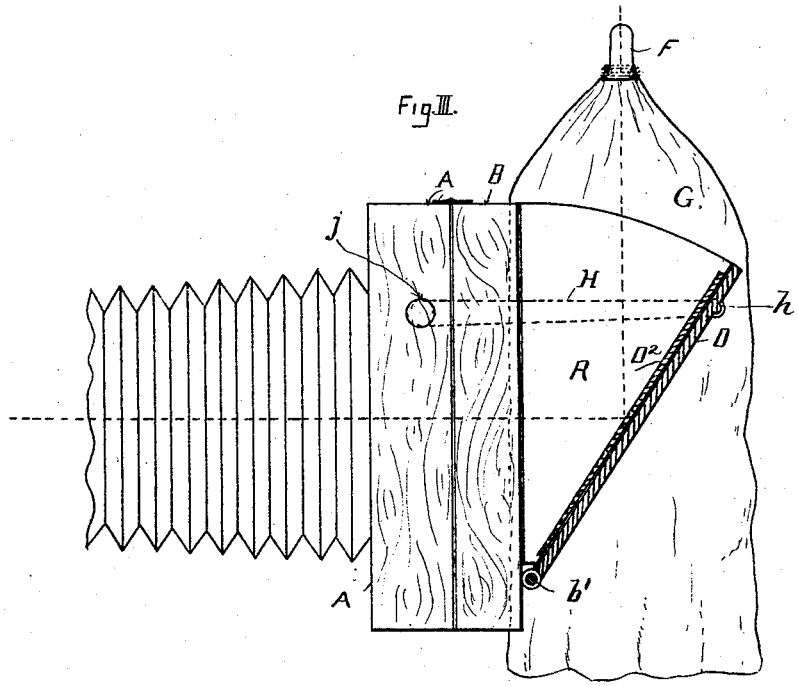
Fig. III.
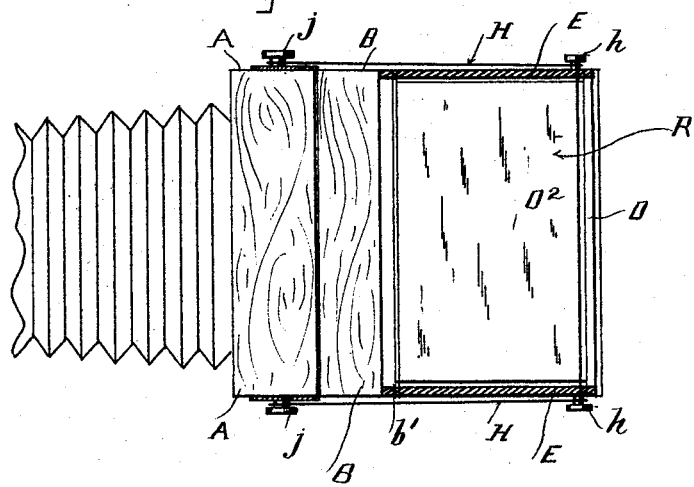
Fig. IV.
WITNESSES:
Franklin Barritt.
Geo. E. Bourhis
INVENTOR
Christopher O. Ellison
BY
James H. Lancaster
ATTORNEY

UNITED STATES PATENT OFFICE.

CHRISTOPHER OBEE ELLISON, OF LIVERPOOL, ENGLAND.

CAMERA.

SPECIFICATION forming part of Letters Patent No. 442,616, dated December 16, 1890.

Application filed May 29, 1890. Serial No. 353,576. (No model.) Patented in England May 18, 1889, No. 8,274.

*To all whom it may concern:*

Be it known that I, CHRISTOPHER OBEE ELLISON, a subject of the Queen of Great Britain, and a resident of the city of Liverpool, in the county of Lancaster, England, have invented certain new and useful Improvements in Cameras, (for which I have obtained a patent in Great Britain, No. 8,274, dated May 18, 1889,) of which the following is a full, clear, and exact specification.

My invention relates to photographic cameras; and the object of my invention is to supply cameras with a portable attachment, whereby the image or picture formed at any point behind the lens (usually reflected inverted) will be seen or viewed in its material upright position.

Referring to the drawings, Figure I is a side view of a camera with my improved attachment. Fig. II is a top view of the same. Fig. III is a sectional view on line $xx$, Fig. II. Fig. IV is a plan section on line $yy$, Fig. I.

A is the camera of the usual form, and B is a frame hinged at its rear end and carrying the usual ground glass.

D is a frame carrying the reflecting-glass $D^2$, and hinged to the back of the frame B at $b'$. When the reflecting-frame is not in use, (see dotted lines, Fig. I,) it is held up against the frame B by the elastic bands H H, placed on both sides of the camera. When the frame is in use, the reflector is drawn out (see full line, Fig. III) and held in this position by the side pieces E E, placed between the frame B and the said reflector-frame.

F is the eye-piece with magnifying focusing-glass, single or double, and to this eye-piece is fastened the handkerchief G, or any other similar piece of cloth.

Operation: To apply my attachment and to use the same, the reflector is first hinged to the frame B at $b'$. The elastic bands H H are then passed over buttons $h\,h$ of the frame D and the set-screws $j\,j$ of the camera-frame B. The said reflector-frame D is then drawn outward or backward sufficiently to allow the side pieces E E to drop in their respective places, holding thereby the frame in place and forming at the same time a dark-compartment R, for the reflection of the picture upon the glass $D^2$. The operator then secures a piece of silk or light material or a pocket-handkerchief to the eye-piece F, allowing the folds thereof to fall down over the reflector and frame. (See Fig. I.) By looking through the eye-piece the picture will be seen reflected right side up, as in nature, upon the said glass of the reflector.

By this device I am able to overcome the difficulty and uncertainty in deciding whether the sitter or picture is in the proper position and in judging of the effect of light and shade on the picture to be taken, and also the necessity of using a cloth to exclude the light from the top while the operator is adjusting the instrument preparatory to taking a picture.

The advantage of this attachment is the simplicity of its construction, whereby the attachment can be readily attached and detached from the camera without injury to the same.

If need be, the reflector-frame can be held up close against the camera, (see dotted lines,) and remain a part of the same.

Having thus described my invention, I desire to claim—

1. In a photographic camera, the reflector $D^2$, hinged to frame B at $b'$ and held in position by the bands H H and the side pieces E E, in combination with the camera A, substantially as and for the purpose set forth.

2. In a photographic camera, the combination of the reflector or mirror $D^2$, attached to hinged frame D, the frame B, the triangular side pieces E E, the elastic bands H H, the eye-piece F, and the handkerchief G, all arranged substantially as and for the purpose set forth.

In testimony that I claim the foregoing I have hereunto set my hand this 4th day of February, 1890.

CHRISTOPHER OBEE ELLISON.

Witnesses:
 W. J. SULIS,
 A. WALLACE.